(12) United States Patent
Foury et al.

(10) Patent No.: US 11,998,936 B2
(45) Date of Patent: Jun. 4, 2024

(54) APPARATUS FOR SPRAYING A FLUID

(71) Applicant: Exel Industries, Epernay (FR)

(72) Inventors: Philippe Foury, Paris (FR); Joseph Tarantini, Paris (FR); Didier Faure, Paris (FR)

(73) Assignee: EXEL INDUSTRIES, Epernay (FR)

( * ) Notice: Subject to any disclaimer, the term of this patent is extended or adjusted under 35 U.S.C. 154(b) by 353 days.

(21) Appl. No.: 17/626,123

(22) PCT Filed: Jul. 10, 2020

(86) PCT No.: PCT/EP2020/069559
§ 371 (c)(1),
(2) Date: Jan. 10, 2022

(87) PCT Pub. No.: WO2021/009046
PCT Pub. Date: Jan. 21, 2021

(65) Prior Publication Data
US 2022/0274124 A1    Sep. 1, 2022

(30) Foreign Application Priority Data

Jul. 12, 2019 (FR) ...................................... 1907881

(51) Int. Cl.
| | | |
|---|---|---|
| *B05B 12/14* | (2006.01) | |
| *B05B 15/55* | (2018.01) | |
| *F16L 55/46* | (2006.01) | |

(52) U.S. Cl.
CPC ........ *B05B 12/1481* (2013.01); *B05B 12/149* (2013.01); *B05B 15/55* (2018.02); *F16L 55/46* (2013.01)

(58) Field of Classification Search
CPC ..... B05B 12/1481; B05B 15/55; B05B 15/58; F16L 55/46
USPC ..................................... 15/3.5, 3.51
See application file for complete search history.

(56) References Cited

U.S. PATENT DOCUMENTS

| | | | | |
|---|---|---|---|---|
| 5,035,021 A | * | 7/1991 | Le Devehat | .......... B08B 9/0554 |
| | | | | 15/104.061 |
| 7,051,950 B2 | * | 5/2006 | Giuliano | ................. B05B 12/14 |
| | | | | 239/693 |
| 7,213,290 B2 | * | 5/2007 | Martin | .................... F16L 11/12 |
| | | | | 15/104.061 |

(Continued)

FOREIGN PATENT DOCUMENTS

| | | |
|---|---|---|
| CA | 2653669 A1 | 12/2007 |
| CN | 101175575 A | 5/2008 |
| CN | 101454606 A | 6/2009 |

(Continued)

*Primary Examiner* — Randall E Chin
(74) *Attorney, Agent, or Firm* — Soquel Group LLC (57) ABSTRACT

Apparatus for spraying a fluid, including a pipe, a scraper capable of moving in the pipe, and a casing defining a storage volume for accommodating the scraper in a position for storing the scraper, the scraper being configured to push fluid in front of it which is present in the pipe when the scraper moves in the pipe, the storage volume being in fluid communication with the pipe and being configured to allow the scraper to move between the storage volume and the pipe. The scraper includes a first magnet, and the casing includes a second magnet capable of exerting a first force on the first magnet to move the scraper from the storage volume to the pipe.

15 Claims, 5 Drawing Sheets

(56) References Cited

U.S. PATENT DOCUMENTS

2006/0000933 A1     1/2006  Duerr et al.

FOREIGN PATENT DOCUMENTS

| CN | 104251365  | A  | 12/2014 |
| CN | 107820449  | A  | 3/2018  |
| CN | 207455052  | U  | 6/2018  |
| CN | 108607752  | A  | 10/2018 |
| CN | 109869572  | A  | 6/2019  |
| EP | 1380350    | A1 | 1/2004  |
| EP | 3639929    | A1 | 4/2020  |
| EP | 3639930    | A1 | 4/2020  |
| WO | 2007137745 | A1 | 12/2007 |
| WO | 2016185136 | A1 | 11/2016 |
| WO | 2020079212 | A1 | 4/2020  |

\* cited by examiner

APPARATUS FOR SPRAYING A FLUID

CROSS-REFERENCE TO RELATED APPLICATIONS

This application claims benefit under 35 USC § 371 of PCT Application No. PCT/EP2020/069559 entitled APPARATUS FOR SPRAYING A FLUID, filed on Jul. 10, 2020 by inventors Philippe Foury, Joseph Tarantini and Didier Faure. PCT Application No. PCT/EP2020/069559 claims priority of French Patent Application No. 19 07881, filed on Jul. 12, 2019.

FIELD OF THE INVENTION

The present invention relates to a fluid spraying facility.

BACKGROUND OF THE INVENTION

Fluid spraying facilities frequently use scrapers to clean the inside of the pipes through which the fluid flows. These scrapers are devices that push the fluid in the conduit in front of them, so that after the scraper has passed, the amount of fluid remaining in the conduit is minimal. Thus, if the nature of the fluid changes, for example if different fluids such as different coloured paints are to be sprayed successively, the risk of the last sprayed fluid being contaminated by residues of the previously sprayed fluid is limited.

When not in use, the scrapers are usually stored in a dedicated portion of the fluid circulation system, usually formed by a rigid envelope delimiting a scraper storage volume. When the scraper is to be used, a dedicated actuator pushes the scraper into a portion of the circuit into which a propulsion fluid is injected. The action of the fluid on the scraper then drives the scraper into the circuit, so that the scraper circulates in the circuit, pushing the fluid residues on the circuit walls in front of it.

However, the presence of this actuator creates a local fragility in the envelope, since the actuator, located outside the envelope, must pass through it to push the scraper. The envelope therefore has at least one opening for the passage of this actuator, which generates a risk of leakage in the event the actuator becomes worn or impacted, or overpressure builds in the circuit.

There is therefore a need for a fluid spraying facility that has a lower risk of leakage than systems of the state of the art, while maintaining a limited risk of contamination of the fluid by residues present in the circuit.

SUMMARY OF THE DESCRIPTION

For this purpose, a fluid spraying facility is proposed comprising a fluid circulation conduit, a scraper capable of flowing in the conduit and an envelope defining a storage volume for receiving the scraper in a scraper storage position, the scraper being configured to push fluid present in the conduit past it as the scraper flows in the conduit, the storage volume being in fluid communication with the conduit and being configured to allow the scraper to flow between the storage volume and the conduit, the scraper comprising a first magnet and the housing comprises a second magnet adapted to exert on the first magnet a first force tending to move the scraper from the storage volume to the conduit.

According to particular embodiments, the facility comprises one or more of the following features taken in isolation or in any combination that is technically possible:
the first magnet is a permanent magnet;
the second magnet is a permanent magnet;
the second magnet is an electromagnet;
the second magnet is capable of exerting the first force when the second magnet is supplied with an electric current having a first direction, and capable of exerting a second force tending to keep the scraper in the storage volume, in particular tending to bring the scraper closer to the second magnet, when the second magnet is supplied with an electric current having a second direction opposite the first direction;
the envelope delimits an opening intended to be traversed by the scraper when the scraper is circulating from the storage volume to the conduit, the scraper being interposed between the second magnet and the opening when the scraper is received in the storage volume, the first force being in particular a force tending to move the first magnet away from the second magnet;
the second magnet is in contact with an external surface of the envelope;
the envelope delimits a first opening connecting the storage volume to the conduit and a second opening leading into the storage volume, the storage volume being interposed between the two openings, the facility further comprising means for injecting fluid into the envelope through the second opening, the second magnet being accommodated in an internal volume of the envelope and being interposed between the second opening and the storage volume, the envelope furthermore delimiting at least one passage configured to conduct the injected fluid from the second opening to the first opening when the scraper is in the storage position;
the second magnet is configured to exert a force of between 1.5 Newtons and 5 Newtons on the first magnet; and
the facility comprises an actuator configured to move a pin between a first position in which the pin obstructs movement of the scraper from its storage position to the conduit and a second position in which the pin allows passage of the scraper from the storage position to the conduit.

BRIEF DESCRIPTION OF THE DRAWINGS

Characteristics and advantages of the invention will become apparent upon reading the following description, given only as a nonlimiting example, referring to the attached drawings, in which.

DETAILED DESCRIPTION OF EMBODIMENTS

Figure 1:
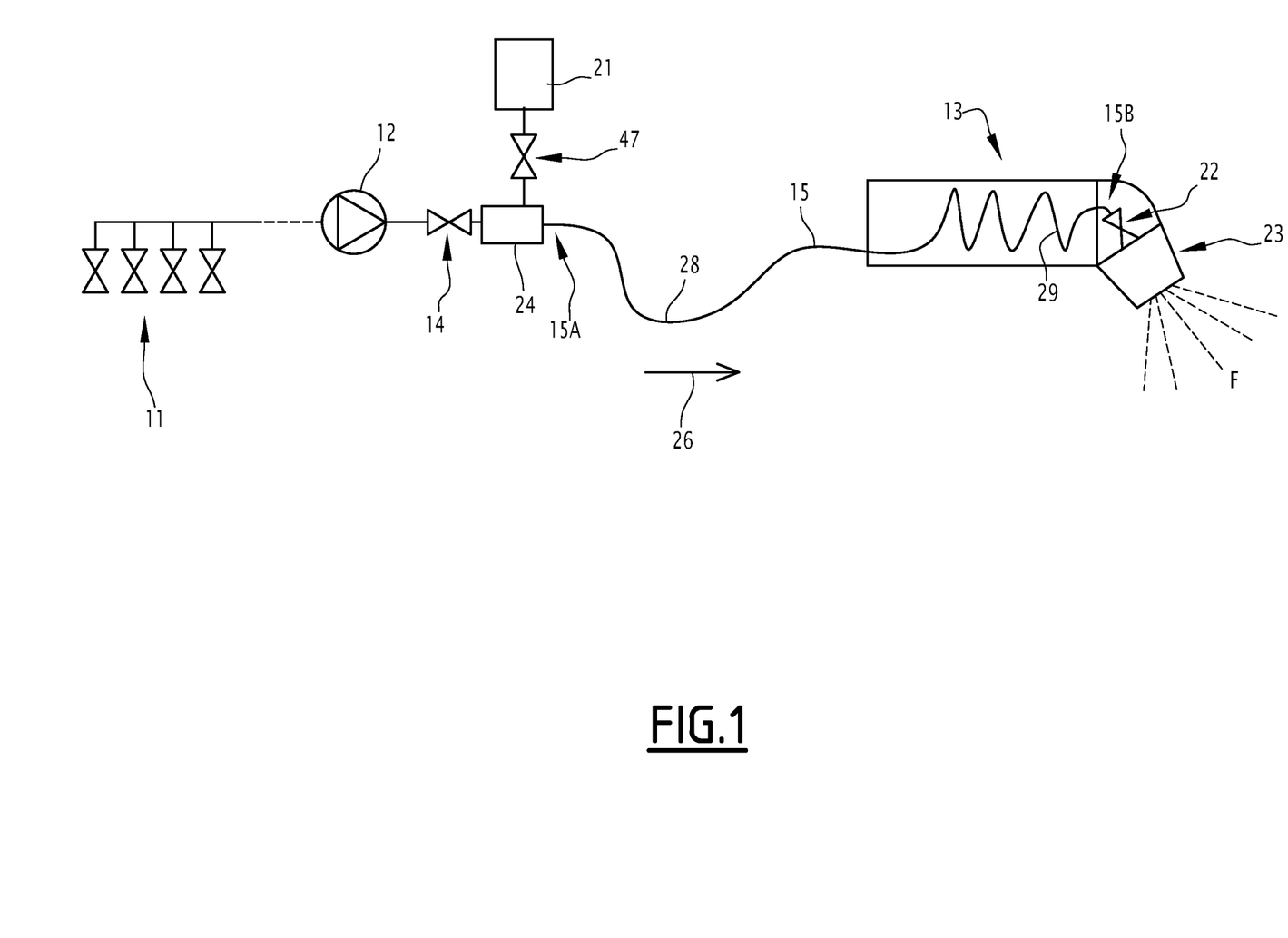
FIG. 1 is a schematic representation of a first example of a fluid spraying facility comprising a fluid circulation conduit, a scraper, and a scraper storage volume.

A first example of a fluid spraying facility 10 is depicted in FIG. 1.

The facility 10 is configured to spray a first fluid F.

The facility 10 comprises, for example, a colour-changing unit 11, a pump 12 and a device 13 for spraying the first fluid F, such as a paint gun or a sprayer.

The facility 10 further comprises a fluid circulation conduit 15, a scraper 20, at least one injector 21 and an envelope 24.

The colour-changing unit 11, the pump 12, the circulation conduit 15, the envelope 24 and the projection member 13 together form a circuit for circulating the first fluid F. The circuit is suitable in particular for conducting the first fluid F from the colour-changing unit 11 to the projection member 13.

The first fluid F is, for example, a liquid, such as a paint or other coating material.

According to one embodiment, the first fluid F comprises a set of electrically conductive particles, in particular metallic particles, such as aluminium particles.

In particular, the colour-changing unit 11 is configured to supply the pump 12 with the first fluid F. In particular, the colour-changing unit 11 is configured to supply the pump 12 with a plurality of first fluids F, and to switch the supply of the pump 12 from one first fluid F to another first fluid F.

In particular, each of the first fluids F with which the colour-changing unit 11 is suitable for supplying the pump 12 is, for example, a paint having a different colour from the colours of the other first fluids F.

The pump 12 is suitable for injecting a flow of the first fluid F received from the colour-changing unit 11 into the circulation conduit 15. For example, the pump 12 is connected to the circulation conduit 15 by a valve 14. In particular, the pump 12 is connected to the circulation conduit 15 through the envelope 24.

The pump 12 is, for example, a gear pump.

The projection member 13 is adapted to receive the first fluid F and to project the first fluid F.

For example, the projection member 13 comprises a valve 22 and a spray head 23.

The projection member 13 is, for example, mounted on a movable arm capable of orienting the projection member 13 towards an object onto which the first fluid F is to be projected.

The valve 22 is configured to connect the circulation conduit 15 to the spray head 23, and to switch between an open configuration allowing the passage of first fluid F from the circulation conduit 15 to the spray head 23 and a closed configuration preventing such passage.

The spray head 23 is configured to spray the first fluid F received from the valve 22.

The fluid circulation conduit 15 is configured to conduct the first fluid F received from the valve 14 to the projection member 13.

The fluid circulation conduit 15 is cylindrical. For example, the fluid circulation conduit 15 has a circular cross-section and extends along a first axis A1.

According to one embodiment, the fluid circulation conduit 15 is straight. Alternatively, the fluid circulation conduit 15 is a curved conduit for which the first axis A1 is locally defined at any point of the fluid circulation conduit 15 as perpendicular to a plane in which the cross-section of the fluid circulation conduit 15 is circular.

Figure 2:
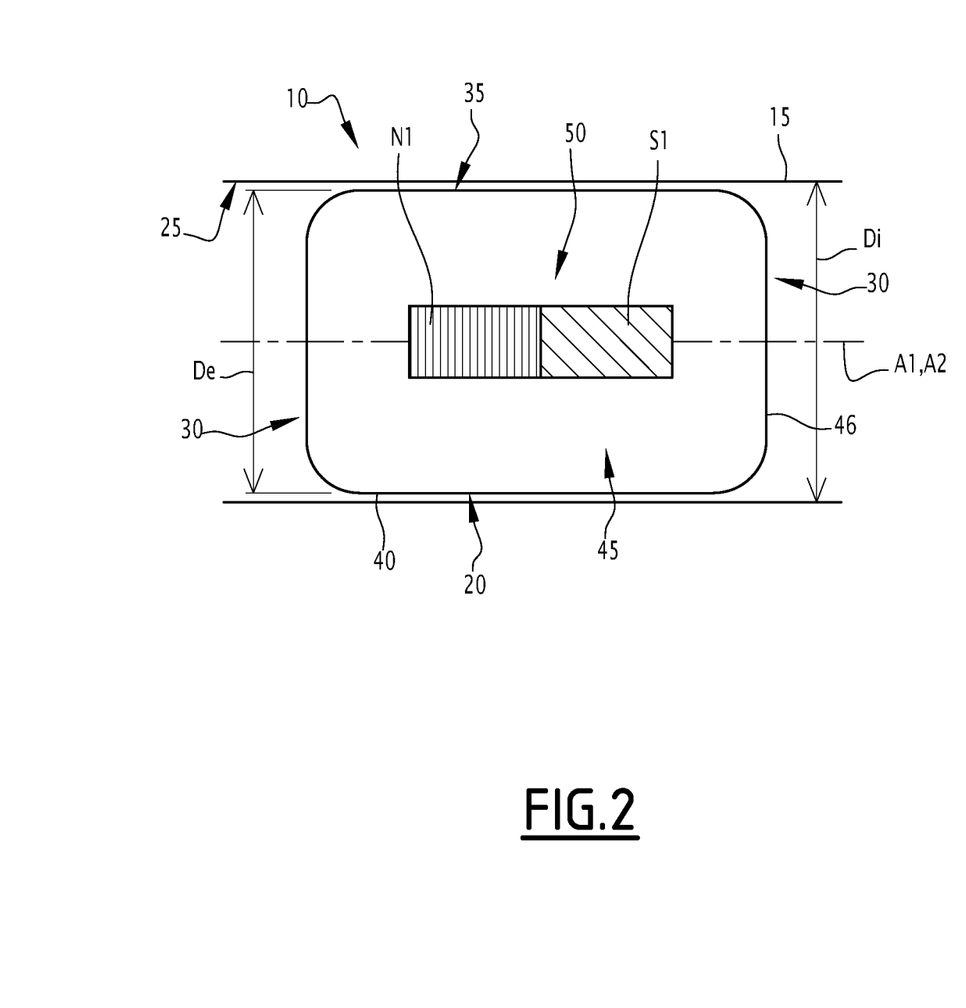
FIG. 2 is a partial schematic representation in cross-section view of the scraper.

The fluid circulation conduit 15 has an inner surface 25, shown in FIG. 2, defining a hole of the fluid circulation conduit 15 in a plane perpendicular to the first axis A1.

Figure 3:
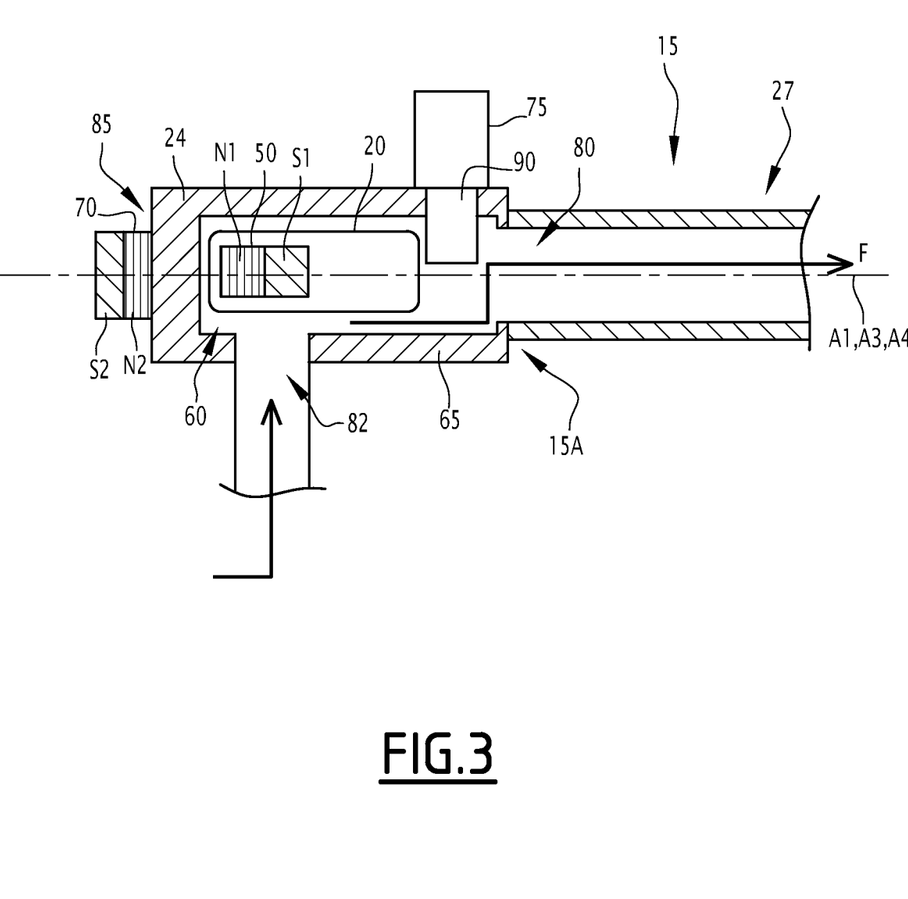
FIG. 3 is a partial schematic representation in cross-section view of the scraper storage volume and an envelope delimiting this storage volume.

The fluid circulation conduit 15 furthermore has an outer surface 27, which is visible in FIG. 3.

An upstream and a downstream are defined for the circulation conduit 15. Upstream and downstream are defined in that, when projecting the first fluid F, the first fluid F flows through the circulation conduit 15 from upstream to downstream.

For example, the pump is configured to inject the first fluid F at an upstream end 15A of the circulation conduit 15 while a downstream end 15B of the circulation conduit 15 is connected to the sprayer to allow the first fluid F to flow from upstream to downstream from the pump to the sprayer through the circulation conduit 15. This is represented in FIG. 1 by an arrow 26.

According to the example shown in FIG. 1, the fluid circulation conduit 15 comprises a first portion 28 and a second portion 29.

The circulation conduit 15 has a length of 50 centimetres or more, for example one metre or more. In one embodiment, each of the first portion 28 and the second portion 29 is greater than or equal to one metre in length.

The first portion 28 is located upstream of the second portion 29.

The first portion 28 is, for example, configured to deform to follow the movement of the projection member 13.

The second portion 29 is, for example, received in the projection member 13 and movable with it.

The second portion 29 is, for example, spiral-shaped.

An inner diameter Di is defined for the fluid circulation conduit 15. The inner diameter Di is measured in a plane perpendicular to the first axis A1 between two diametrically opposed points on the inner surface 25.

The inner diameter Di is, for example, between 3.8 and 6.2 mm. It should be noted that the inner diameter Di of the circulation conduit 15 may vary.

The fluid circulation conduit 15 is, for example, made of a metallic material. Alternatively, the fluid circulation conduit 15 is made of a polymeric material.

The scraper 20 is configured to flow through the fluid circulation conduit 15 to push the first fluid F on the inner surface 25 ahead of it as it moves through the fluid circulation conduit 15. In particular, the scraper 20 is configured to clean the inner surface 25, i.e. to leave behind an inner surface 25 covered with a quantity of first fluid F less than the quantity covering the inner surface 25 prior to the passage of the scraper 20, for example to remove all of the first fluid F covering the inner surface 25 of the portions of the conduit 15 in which the scraper 20 is circulating.

"Pushing ahead of it" means that the scraper 20, travelling in one direction in the fluid circulation conduit 15, imposes a movement in that direction on first fluid F which is received in the portion of the conduit 15 towards which the scraper 20 is moving. For example, a scraper 20 moving from upstream to downstream imposes a downstream movement on the first fluid F located downstream of the scraper 20.

The scraper 20 extends along a second axis A2.

The scraper 20 comprises at least one portion having a circular cross-section in a plane perpendicular to the second axis A2.

According to the example in FIG. 2, the scraper 20 is substantially cylindrical and rotationally symmetrical about the second axis A2.

The scraper 20 is intended to circulate in the circulation conduit 15 when the scraper 20 is received in the hole of the circulation conduit 15 and the first axis A1 is coincident with the second axis A2, as shown in FIG. 2.

The scraper 20 has an outer diameter De. The outer diameter De is the outer diameter of the portion of the scraper 20 having the largest outer diameter in a plane perpendicular to the second axis A2.

The outer diameter is, for example, equal to the inner diameter Di of the circulation conduit 15. Alternatively, the outer diameter De is strictly smaller than the inner diameter Di of the circulation conduit 15.

The scraper 20 has two end faces 30 delimiting the scraper 20 along the second axis A2. A length of the scraper 20, measured along the second axis A2 between the two end faces 30, is between, for example, the inner diameter Di of the circulation conduit 15 and twice the inner diameter Di.

The scraper 20 furthermore has a side face 35 delimiting the scraper 20 in a plane perpendicular to the second axis A2. When the scraper 20 is substantially cylindrical, the outer diameter is measured between two diametrically opposed points on the side face 35.

The scraper 20 comprises, for example, a shell 40 defining a chamber 45. In this case, the end faces 30 and the side face 35 are external faces of the shell 40. In particular, the shell 40 comprises two end walls 46 which separate the chamber 45 from the outside of the shell 40 along the second axis A2. In this case, the end faces 30 are end wall faces 46.

The end walls 46 are, for example, flat walls perpendicular to the second axis A2.

The shell 40 is, for example, made of polytetrafluoroethylene (PTFE), Polyethylene, a polyolefin, polyetheretherketone (PEEK), polyoxymethylene (POM), or Polyamide.

Alternatively, the scraper 20 is solid, i.e. no chamber 45 is delimited by the shell 40. In this case the scraper 20 will be made of materials with good elastic properties such as an elastomer, especially a solvent resistant perfluoroelastomer.

The scraper 20 comprises a magnet 50.

The magnet 50 is integral with the scraper 20. The magnet 50 is, for example, housed in chamber 45.

The magnet 50 is, for example, a permanent magnet, such as a neodymium magnet.

However, embodiments in which the magnet 50 is an electromagnet are also possible.

The magnet 50 has a north pole N1 and a south pole S1. The north pole N1 and south pole S1 of the magnet 50 are, for example, aligned along the second axis A2.

In FIGS. 2 and 3, the north and south poles of each magnet are indicated schematically by a vertically striped half and a diagonally striped half of the magnet, respectively.

In particular, the magnet 50 is capable of exerting a magnetic force greater than or equal to 1 newton (N), for example between 1.5 N and 5 N.

The injector 21 is configured to inject a second fluid into the circuit, in particular into the circulation conduit 15. For example, the injector 21 is configured to inject into the circulation conduit 15 a stream of second fluid having a flow rate controllable by the injector 21.

In particular, the injector is configured to inject the second fluid into the circulation conduit 15 via the envelope 24. In other words, the envelope 24 is configured to receive the second fluid from the injector 21 and to transmit the received second fluid to the circulation conduit 15, in particular to the upstream end 15A.

In the example shown in FIG. 1, the injector 21 is connected to the envelope 24 via a valve 47.

The second fluid is, for example, a separate fluid from the first fluid F to be sprayed. For example, the second fluid is a liquid, sometimes called "cleaning fluid". The liquid is, in particular, a solvent suitable for dissolving or diluting the first fluid F. For example, when the first fluid F is a water-based paint, the liquid is water. It should be noted that the type of solvent used is likely to vary, particularly according to the nature of the first fluid F.

It should also be noted that liquids other than solvents may be used as a second fluid.

Alternatively, the second fluid is a first fluid F intended to be sprayed after the first fluid F present in the circulation conduit 15, for example a first fluid F having a different colour from the first fluid F present in the circulation conduit 15. In another embodiment, the second fluid is a gas such as compressed air.

Many different types of injector 21 can be used in the facility 10, depending on the second fluid to be injected. For example, the injector 21 is a gear pump or a compressor suitable for generating a gas flow.

It should be noted that, although the injector 21 is described above as a device separate from the pump 12, it is conceivable that the role of the injector 21 is fulfilled by the pump 12, for example if the colour-changing unit 11 comprises a reservoir of second fluid which the pump 12 is then able to inject into the conduit 15 via the envelope 24.

The envelope 24, also called the "station", delimits an internal volume 60, this volume 60 being hereafter called the "scraper 20 storage volume".

For example, the facility 10 comprises two such envelopes 24, each of which is arranged at an upstream 15A or downstream 15B end of the circulation conduit 15.

The envelope 24 is, for example, made of a plastic material, in particular polyoxymethylene. Alternatively, the envelope 24 is made of a non-magnetic metallic material, in particular a stainless steel such as stainless steel 303.

Each envelope 24 comprises, for example, a hollow block 65 delimiting the storage volume 60. The block 65 is, for example, single-piece.

Alternatively, the block 65 is replaced by a housing consisting of several parts attached to each other. In another embodiment, the block 65 is replaced by a portion of the circulation conduit 15 that delimits the storage volume.

It should be noted that the block 65 or housing may be made of a number of different materials.

The envelope 24 further comprises a magnet 70 and, optionally, an actuator 75.

"Storage volume" 60 means a volume provided to accommodate the scraper 20 when the scraper 20 is not circulating in the conduit 15. In particular, the facility 10 comprises means for holding the scraper 20 in a storage position in which the scraper 20 is accommodated in the storage volume 60.

The storage volume 60 is configured such that, when the scraper 20 is in the storage position, the scraper 20 allows fluid F to flow from the upstream end 15A to the downstream end 15B of the conduit 15.

The storage volume 60 is, for example, cylindrical and extends along a fourth axis A4. However, the shape of the storage volume 60 may vary.

In particular, the storage volume 60 is provided to allow the fluid F to flow around the scraper 20 when the scraper 20 is in the storage position. For example, the storage volume 60 has a diameter strictly larger than the outer diameter of the scraper 20 when the scraper 20 is in the storage position.

Alternatively, when the scraper 20 is in the storage position, the scraper 20 is disposed outside a fluid path connecting the upstream end 15A to the injector 21.

The storage volume 60 is in fluid communication with the conduit 15. In other words, the storage volume 60 is such that it allows the fluid F to flow from the storage volume to the conduit 15 and vice versa.

For example, the storage volume 60 opens into the conduit 15, in particular into the upstream end 15A or into the downstream end 15B, via an opening 80 in the envelope 24.

In addition, the storage volume 60 is configured to allow the scraper 20 to circulate between the storage volume 60 and the conduit 15. In particular, the opening 80 is intended to be passed through by the scraper 20 when the scraper 20 is circulating from the storage volume 60 to the circulation conduit 15, and vice versa. In this case, the opening 80 connects the storage volume 80 to the upstream end 15A. In particular, the opening 80 has a diameter greater than or equal to the outer diameter De of the scraper 20.

According to the example shown in FIG. 3, the fourth axis A4 is coincident with the first axis A1. In this case, the opening 80 delimits the storage volume 60 along the fourth axis A4.

According to the example shown in FIG. 1, the injector 21 is for example configured to inject the second fluid through an opening 82 provided in a side wall of the envelope 24, i.e. a wall delimiting the storage volume 60 in a plane perpendicular to the fourth axis A4.

However, according to conceivable variants, the injector 21 is configured to inject the second fluid through an opening 82 provided in a longitudinal wall of the envelope 24, i.e. a wall delimiting the storage volume 60 along the fourth axis A4. For example, the storage volume 60 is interposed along the fourth axis A4 and/or along the first axis A1 between the openings 80 and 82.

It should be noted that, although only one opening 82 is shown in FIG. 3, the number of openings 82 may vary.

The magnet 70 is, for example, a permanent magnet. For example, magnet 70 is a neodymium magnet.

The magnet 70 is, for example, in contact with an external face 85 of the envelope 24. In particular, the external face 85 is a face of the block 65 delimiting the envelope along the fourth axis A4, notably opposite the opening 80.

Alternatively, the magnet 70 is integrated into the block 65 in such a way that the magnet 70 is at least partially interposed between the storage volume 60 and the external face 85 of the envelope 24, or else is accommodated in the storage volume 60, resting against the portion of the block 65 which is delimited along the fourth axis A4 by the storage volume 60 and by the external face 85.

The scraper 20 is interposed between the magnet 70 and the opening 80 when the scraper 20 is in the storage position.

The magnet 70 has a north pole N2 and a south pole S2.

The magnet 70 is configured to exert a first force on the magnet 50 tending to move the scraper 20 from the storage volume 60 to the conduit 15. For example, the first force is a force tending to move the scraper 20 from the storage volume 60 to the circulation conduit 15 through the opening 80.

In particular, the first force is a force tending to move the magnet 50 away from the magnet 70.

For example, the north pole N2 of the magnet 70 is directed towards the scraper 20 when the scraper 20 is in the storage position, with the north pole N1 directed towards the magnet 70 when the scraper 20 is in the storage position. In other words, the north poles N1 and N2 are interposed between the poles on S1 and S2, along the fourth axis A4, when the scraper 20 is in the storage position.

In this case, the north pole N2 is, for example, interposed between the south pole S2 of the magnet 70 and the scraper 20, the north pole N1 being interposed between the south pole S1 and the magnet 70 when the scraper 20 is in the storage position.

In one embodiment, the north and south poles N1 and S1 of magnet 50 are spatially interchanged, as are the north and south poles N2 and S2 of magnet 70.

In particular, the magnet 70 is able to generate a magnetic force greater than or equal to the magnetic force generated by the magnet 50. In particular, the magnet 70 is configured to exert a force greater than or equal to 1 N, in particular between 1.5 N and 5 N, on the magnet 50 when the scraper 20 is in the storage position.

When the scraper 20 is in the storage position, a distance between the magnet 50 and the magnet 70 is between 1 millimetre (mm) and 5 mm.

For example, a partition of the envelope 24 delimited by the external face 85 and by the storage volume 60 along the axis A4 has a thickness of between 0 mm and 5 mm, the scraper 20 bearing against this partition when the scraper 20 is in the storage position.

The actuator 75 is configured to exert a second force on the scraper 20 tending to hold the scraper 20 in the storage position.

For example, the actuator 75 is configured to move a pin 90 between a first position and a second position.

The actuator 75 is for example a hydraulic or pneumatic cylinder, or an electric motor.

The pin 90 is accommodated in a passage through the envelope 24 from the exterior of the envelope 24 to the storage volume 60.

When the pin 90 is in the first position, the pin 90 obstructs movement of the scraper 20 from the storage volume 60 to the conduit 15. For example, when the pin 90 is in the first position, the pin 90 protrudes from an inner face of the envelope 24 so as to partially close the opening 80.

When the pin 90 is in the second position, the pin 90 allows the scraper 20 to pass from the storage volume 60 to the conduit 15. For example, the pin 90 is accommodated in a cavity in the envelope 24, so that the pin 90 no longer protrudes from said inner face of the envelope 24.

A first example of a method for cleaning the inner surface 25 of the conduit 15 will now be described.

In an initial step, the first fluid F is present in the hole of the circulation conduit 15. For example, the first fluid F partially covers the inner surface of the circulation conduit 15.

Initially, the scraper 20 is in the storage position. In particular, the pin 90 is in the first position. Thus, the magnet 70 exerts the first force on the scraper 20, but such movement is prevented by the second force exerted by the actuator 75, via the pin 90, on the scraper 20.

In addition, the first fluid F is injected into the circulation conduit 15, so that the first fluid F reaches the downstream end 15B to be sprayed there by the projection member 13. In particular, the first fluid F is injected into the storage volume 60 and passes through the opening 80 to reach the upstream end 15A of the circulation conduit 15.

In an injection step, the scraper 20 is moved from the storage position to the conduit 15. For example, the actuator 75 moves the pin 90 to its second position, and the first force exerted by the magnet 70 on the magnet 50 then moves the scraper 20 from the storage position to the upstream end 15A of the conduit 15.

In a circulation step, the scraper 20 circulates in the circulation conduit 15. In particular, the scraper 20 is inserted at one end 15A, 15B of the circulation conduit 15 and propelled to the other end 15A, 15B of the circulation conduit 15 by a flow of second fluid injected upstream of the scraper 20 into the circulation conduit 15, for example by a flow of second fluid injected into the storage volume 60 and passing through the opening 80.

The second fluid flow then exerts a third force on one of the end faces 30 tending to propel the scraper in the circulation conduit 15 along the first axis A1.

In the circulation step 20, the first axis A1 and the second axis A2 are merged.

Under the effect of the second fluid flow, the scraper 20 circulates in the circulation conduit 15. For example, when the second fluid flow is injected into the upstream end 15A of the conduit 15, the scraper 20 flows from upstream to downstream. It should be noted that the direction of flow of the scraper 20 may vary, for example if the second fluid flow is injected into the downstream end 15B of the conduit 15.

During its circulation, the scraper 20 pushes ahead of it the first fluid F present in the circulation conduit 15, thus allowing the recovery of the first fluid F. For example, a valve for the recovery of the first fluid F opening into the downstream end 15B of the conduit 15 allows the exit of the first fluid F pushed ahead by the scraper 20. Alternatively, the first fluid F exits the circulation conduit through the valve 22 of the projection member 13.

The inner surface 25 of the circulation conduit 15 is thus cleaned, as the scraper pushes ahead the first fluid F present on the inner surface 25 of the conduit 15.

During a storage step, the scraper 20 is returned to its storage position, for example under the effect of a flow of second fluid injected at the downstream end 15B and exerting on the scraper 20 a fourth force tending to move the scraper 20 towards the upstream end 15A and then towards the storage position. The scraper 20 is then locked in the storage position by the action of the pin 90, moved by the actuator 75 from the second position to the first position.

With the magnet 70, the scraper 20 can be efficiently moved from its storage position to the conduit 15 without the need to drill an opening in the envelope 24 for this purpose, as is the case in installations of the state of the art. Since the number of openings in the envelope 24 is reduced, the risk of leakage is reduced.

A permanent magnet 70 makes the system 10 very easy to use. The use of repulsion between two magnets 50 and 70 whose poles of the same sign are close to each other is also very simple.

When, in the storage position, the scraper 20 is interposed between the opening 80 and the magnet 70, the operation of the system is particularly simple.

When the magnet 70 is in contact with the outer surface of the envelope 24, the system 10 is also particularly simple to implement and operate.

The actuator 75 and the pin 90 allow the scraper 20 to be easily held in position in the storage position.

A second example facility 10 will now be described.

Elements identical to the first example are not described again. Only differences are highlighted.

The magnet 70 is an electromagnet. In particular, the magnet 70 is configured to generate a magnetic field oriented along the fourth axis A4.

For example, the magnet 70 comprises a coil formed by an electrical conductor wound around an axis parallel to or coincident with the fourth axis A4.

The magnet 70 is configured to exert the first force and the second force on the scraper 20.

The facility 10 further comprises a power supply suitable for supplying the magnet 70 with an electric current suitable for causing the magnet 70 to generate the first force and/or the second force.

For example, the power supply is configured to supply the magnet 70 with a first electric current having a first direction of flow and with a second electric current having a second direction of flow. The two meanings are opposed to each other.

For example, the two electric currents are electric currents each with a particular intensity, the intensity of the first current having the opposite sign as the intensity of the second current. In particular, each current is defined as the corresponding current intensity when this current flows in the electromagnet 70, in particular in the coil of the electromagnet 70.

The intensities are, for example, equal in absolute value. Alternatively, these absolute values are different from each other.

When the electromagnet 70 is supplied with the first current, the electromagnet exerts the first force.

When the electromagnet 70 is supplied with the second current, the electromagnet exerts the second force. The second force is then a force tending to bring the magnets 70 and 50 closer together.

The system 10 also has no actuator 75 and no pin 90.

A second example of a cleaning method, implemented by the second example facility 10, will now be described. Elements identical to the first example method are not described again. Only differences are highlighted.

In the initial step and in the storage step, the electromagnet 70 is supplied with the second current to attract the scraper 20 to the electromagnet 70 and thereby move it to, or hold it in, the storage position.

During the injection step, the electromagnet 70 is supplied with the first current and thus moved towards the conduit 15.

This makes the system 10 even less prone to leakage, as the opening required for the passage of the pin 90 is no longer necessary. The tightness of the envelope 24 is thus further improved.

A third example facility 10 will now be described. The same elements as in the first example facility 10 are not described again; only the differences are highlighted.

Figure 4:
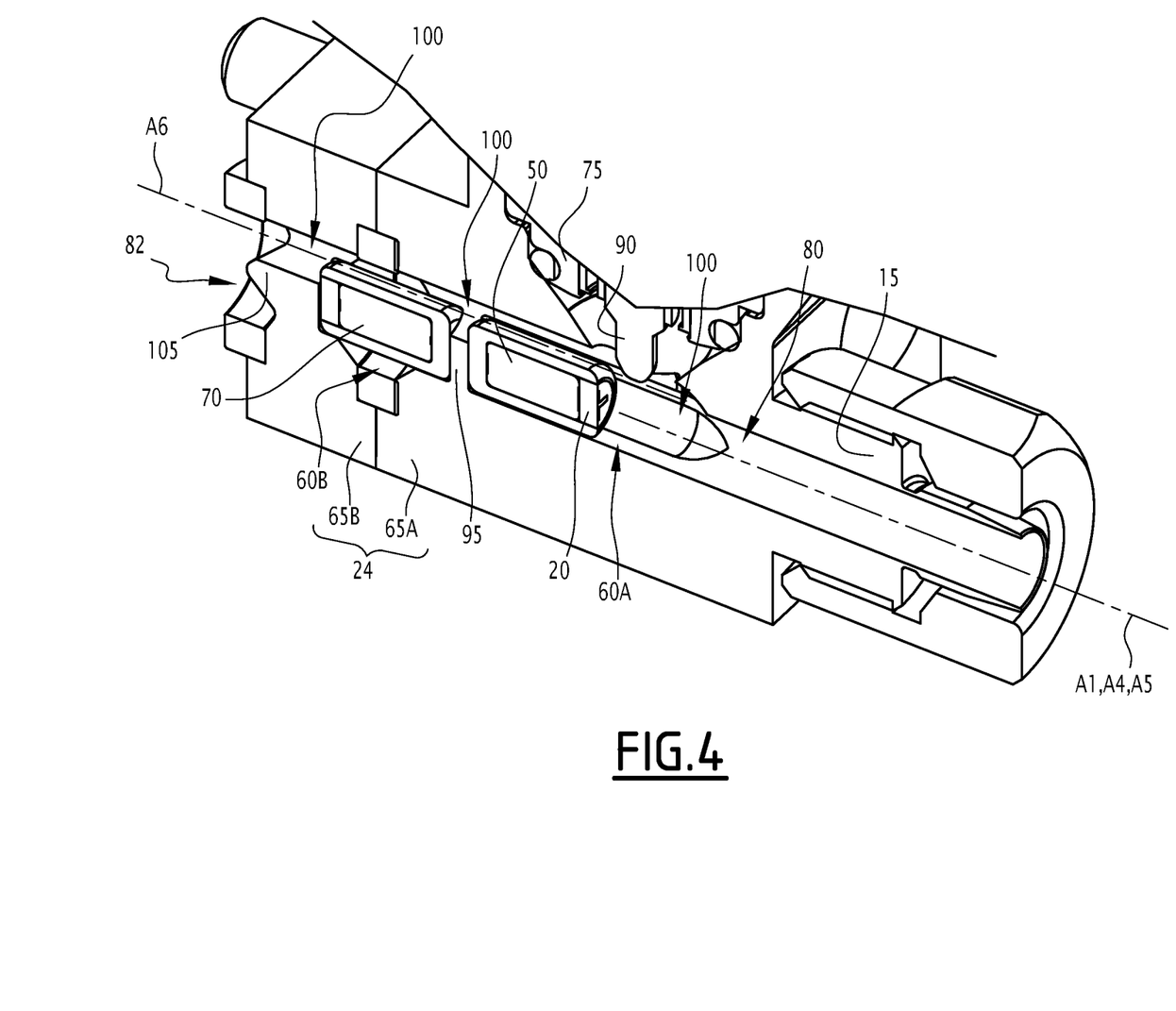
FIG. 4 is a cross-sectional representation of the storage volume and envelope of another example of a fluid spraying facility.

The third example is shown in FIG. 4.

In the third example facility 10, the magnet 70 is housed in the envelope 24. In particular, the magnet 70 is accommodated in the storage volume 60.

For example, the envelope 24 comprises at least two separate blocks, denoted 65A and 65B in FIG. 4, which together at least partially bound the interior volume of the envelope 24.

The interior volume of the envelope 24 comprises the storage volume, hereinafter referred to as 60A, and a volume 60B accommodating the magnet 70, hereinafter referred to as the "rear volume" 60B.

The block 65A delimits the storage volume 60A and the opening 80. The block 65A is interposed between the circulation conduit 15 and block 65B.

In addition, the block 65A partially delimits the rear volume 60B. In particular, the block 65A delimits the rear volume 60B at least along the first axis A1.

In particular, the block 65A has a protrusion 95 extending between the storage volume 60 and the rear volume 60B so as to prevent the magnet 70 from moving towards the scraper 20 along the axis A1 when the scraper 20 is in the storage position. For example, the protrusion 95 separates the storage volume 60A from the rear volume 60B.

The protrusion 95 has a thickness of, for example, between 0.5 mm and 4 mm. The thickness of the protrusion 95 is measured along the first axis A1.

The block 65B at least partially bounds the rear volume 60B. In particular, the block 65B delimits the rear volume 60B at least along the first axis A1.

The block 65B also delimits the opening 82.

The storage volume 60A is interposed between the rear volume 60B and the opening 80 along the first axis A1.

The opening 80 leads into the storage volume 60A. The opening 80 extends along the axis A1 so as to allow the scraper 20 to move from the storage volume 60A to the circulation conduit 15 through the aperture 80 by a translational movement along the axis A1.

The rear volume 60B houses the magnet 70. For example, the rear volume 60B is coaxial with the storage volume 60A.

In particular, the rear volume 60B is rotationally symmetrical about the first axis A1. The rear volume 60B has, in particular, two cylindrical end portions and a central portion.

Each end portion has, for example, a diameter equal to the diameter of the storage volume 60A.

The central portion is interposed between the two end portions. The central portion is, for example, delimited by two right circular cones with a common base. The common base has a diameter strictly greater than the diameter of the end portions.

In particular, the common base is arranged at the interface between blocks 65A and 65B, so that one cone is bounded by block 65A and the other cone is bounded by block 65B.

The rear volume 60B is interposed between the storage portion 60A and the opening 82 along the first axis A1.

The opening 82 extends along a fifth axis A5, this fifth axis A5 being in particular coincident with the axis A1.

In particular, the opening 82 is cylindrical. The opening 82 has, for example, a diameter between 2 mm and 10 mm. The diameter of the opening 82 is, in particular, equal to the diameter of the opening 80 and/or of the circulation conduit 15.

The internal volume of the envelope 24 is further configured to allow the passage of fluid, in particular the second fluid, between the openings 80 and 82 when the scraper 20 is in the storage position. In particular, the internal volume comprises, in addition to volumes 60A and 60B, at least one passage 100 extending along a sixth axis A6 between an opening 82 and opening 80.

For example, the envelope 24 delimits a plurality of passages 100 each extending from the opening 82 to the opening 80. In particular, the envelope 24 delimits three passages 100.

It should be noted that, optionally, the block 65B has a protrusion 105 extending along the axis A5 towards the outside of the block 65, this protrusion 105 being disposed within the opening 82. The protrusion 105 is, for example, substantially conical.

In particular, the protrusion 105 limits the amount of fluid contained in the opening 82 and better directs the flow of fluid to the passages 100.

Each passage 100 extends along a corresponding sixth axis A6. The sixth axis A6 is, for example, parallel to the first axis A1.

Each passage 100 is, in particular, formed by a borehole or trench extending radially from volumes 60A, 60B and extending along the corresponding sixth axis A6 so as to allow fluid to pass through the passage 100 from the opening 82 to the opening 80 when the scraper 20 is in the storage position.

At least one passage 100 is, in particular, made by a borehole, for example cylindrical, extending the opening 82 to the opening 80 or to the storage volume 60A.

The diameter of each borehole is, for example, between half and three-quarters of the diameter of the opening 82. In particular, the diameter of each borehole is greater than or equal to twice the offset between the axes A5 and A6.

Each passage 100 extends from volumes 60A and 60B in a direction perpendicular to the axis A1 of volumes 60A, 60B, and communicates with these volumes 60a, 60B.

Each passage 100 then has, for example, a shape delimited in a plane perpendicular to the axes A1 and A5 by a cylinder having the diameter of the passage 100 and extending along the axis A5, from which the volume delimited by a cylinder having the diameter of the volumes 60A, 60B and centred on the axis A1 has been excluded.

Thus, as the fluid flows between the openings 82 and 80, the fluid passes along at least the scraper 20, for example the scraper 20 and the magnet 70. In particular, the fluid is in contact with at least part of the scraper 20 and/or the magnet 70.

It should be noted that the passage 100 may be in other shapes. For example, each passage 100 has a polygonal cross-section.

The passages 100 are, for example, angularly distributed around the first axis A1, in particular spaced equidistant as in FIG. 1. For example, an angle between the segments connecting two consecutive sixth axes A6 to the axis A1 is 120°, regardless of the pair of axes A6 considered.

Thus, the fluid injected through the opening 82 flows around the magnet 70 and the scraper 20 through the passages 100.

In particular, a distance between each sixth axis A6 and the axis A1 is identical for all axes A6.

The passages 100 allow the fluid flow to circulate between the openings 80 and 82 in a direction mainly parallel to the axis A1, and thus to suffer little pressure loss during its movement since that movement is mainly in a straight line. This makes it easier to flush the system 10 and in particular the storage volume. In particular, the internal volume 60A, 60B, 100 of the envelope 24 is free of dead zones in which fluid could accumulate and not be effectively flushed.

It should be noted that embodiments in which a single passage 100 is present, or in which the number of passages 100 is different from three, are also possible.

Figure 5:
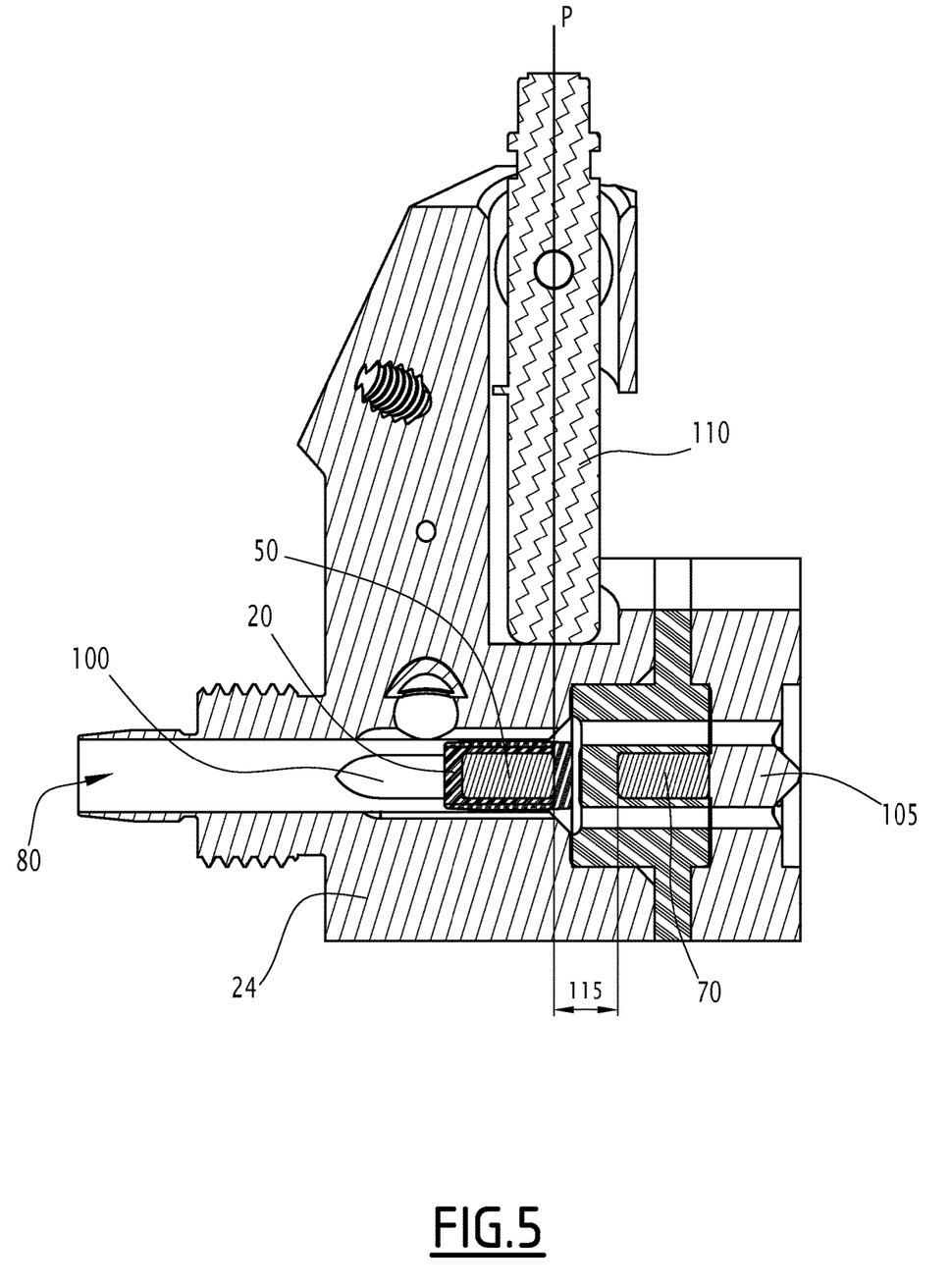
FIG. 5 is a cross-sectional view of one embodiment of the facility of FIG. 4.

According to an embodiment shown in FIG. 5, the facility 10 comprises a sensor 110 for the presence of the scraper 20 in the storage volume 60, 60A.

In particular, the sensor 110 is configured to measure values of a magnetic field at a point and to detect the presence of the scraper 20 based on the measured values.

For example, the sensor 110 is configured to compare the measured values to a threshold, in particular to compare an absolute value of the measured values to the threshold, and to detect the presence of the scraper 20 when a measured value or absolute value is greater than or equal to the threshold.

As will become apparent later, "measure values of a magnetic field" means to measure a parameter directly correlated to the magnetic field, even if the value of the magnetic field (e.g. in teslas) is not directly calculated. An example of such a measurement is the measurement of an electrical resistance, current or voltage, depending on the magnetic field.

When the sensor 110 detects a presence of the scraper 20 in the storage volume 60, 60A, the sensor 110 generates, for example, an electrical signal to another device such as a control module of the facility 10, or a signal to supply power to a lamp or light emitter.

In particular, the point belongs to a plane P interposed along the fourth axis A4 between the two magnets 50 and 70 when the scraper 20 is in the storage position. The plane P is perpendicular to the fourth axis A4.

According to one embodiment, when the scraper 20 is in the storage position, the two magnets 50, 70 are offset from each other along the fourth axis A4. In particular, the two magnets 50, 70 are at least partially superimposable on each other by translation along the fourth axis A4.

When the scraper 20 is in the storage position, the first magnet 50 and the second magnet 70 delimit between them, along the fourth axis A4, a portion of space referred to hereinafter as "intermediate space" 115. In particular, the intermediate space 115 is delimited by one end of the first magnet 50 and by one end of the second magnet 70. It should be noted that the intermediate space 115 is not necessarily empty, in particular the space 115 is likely to contain at least a portion of the scraper 20 and a portion of the envelope 24.

The plane P has at least one point in common with the intermediate space 115 and/or at least one point in common with one of the ends delimiting the intermediate space 115. According to the example in FIG. 5, the plane P has a point in common with the end of the first magnet 50 delimiting the intermediate space 115 when the scraper 20 is in the storage position.

In other words, the magnetic field measurement point is located at the gap 115 between the two magnets 50, 70.

A distance, in a direction perpendicular to the axis A4, between the point P and the magnet 50, 70 closest to the point P is, for example, between 5 and 10 mm.

A distance between the two magnets 50, 70, when the scraper 20 is in the storage position, is for example between 2 mm and 10 mm, in particular between 2 mm and 5 mm. In particular, the distance is 3.5 mm.

The sensor 110 is, for example, configured to measure values of a radial component of the magnetic field, i.e. a component perpendicular to the fourth axis A4. It should be noted that measuring other components of the magnetic field is also possible.

The sensor 110 comprises, for example, a measurement module configured to measure magnetic field values and a detection module configured to detect the presence of the scraper 20 from the measured values.

The measuring module is, for example, a magnetoresistive measuring module, in which an element has an electrical resistance that varies as a function of the magnetic field. The intensity of the current flowing through the element, and/or the electrical voltage across the element, is in such a case also correlated to the value of the magnetic field.

In addition, other types of sensors using non-magnetoresistive measurement modules are also possible. For example, in one embodiment, the measurement module calculates a magnetic field value in teslas and transmits the calculated value to the detection module. The detection module then compares the calculated value to a threshold and detects the presence of the scraper if the calculated value is greater than or equal to the threshold.

When the measurement module is a magnetoresistive module, the detection module compares the resistance value, current value and/or voltage value to a corresponding resistance, current or voltage threshold, and detects the presence of the scraper 20 based on the comparison.

The resistance, current or voltage threshold is a threshold corresponding to the magnetic field threshold, i.e. when the magnetic field value is equal to the magnetic field threshold, the resistance value is equal to the resistance threshold, the current value is equal to the current threshold or the voltage value is equal to the voltage threshold.

It should be noted that the current, voltage and resistance may increase as the magnetic field increases, or decrease as the magnetic field increases, depending on the type of measurement module used.

Thus, according to one embodiment, the detection module compares the current, voltage or resistance value with the resistance, current or voltage threshold, respectively, and detects the presence of the scraper if the resistance, current or voltage value is greater than or equal to the corresponding resistance, current or voltage threshold. This is then equivalent to saying that the measured magnetic field value is greater than or equal to the magnetic field threshold.

According to another embodiment, the detection module compares the current, voltage or resistance value with the resistance, current or voltage threshold, respectively, and detects the presence of the scraper if the resistance, current or voltage value is less than or equal to the corresponding resistance, current or voltage threshold. This is then equivalent to saying that the measured magnetic field value is greater than or equal to the magnetic field threshold.

Magnetoresistive measuring modules are well known and used in many applications such as reading hard drives.

It should be noted that while the sensor 110 has been described above as having a separate measurement module and a detection module, embodiments in which these two modules are combined are also possible.

The use of a sensor 110 measuring magnetic field values allows the presence of the scraper 20 to be detected without the need for an additional opening in the envelope 24 to allow the passage of a mechanical detection device, taking advantage of the presence of the first magnet 50. The risk of leakage is therefore reduced.

Furthermore, the use of magnetic sensors is not incompatible with working in an explosive atmosphere.

By comparing the measured values to a threshold, the presence of the scraper 20 can be easily detected with minimal mathematical processing. When two magnets are arranged close to each other and their poles of the same sign are directed towards each other, as is the case with magnets 50, 70, the magnetic field values at the gap 115 between the magnets 50, 70 increase significantly even at a relatively large distance from the magnets 50, 70, compared to the values measured at the same point in the presence of only one of the magnets 50, 70. In other words, the magnetic field lines are pushed away from the magnets 50, 70 at the intermediate space 115.

When the measurement point belongs to a plane P interposed between the two magnets 50, 70, it is therefore possible to detect the presence of the scraper 20 in the storage volume 60, 60A by positioning the sensor 110 at a relatively large distance from the second magnet 70 and thus to avoid the sensor 110 detecting the first magnet 70 in the absence of the scraper 20. The detection of the scraper 20 is then more accurate since the risk of false positives is reduced.

The invention corresponds to any technically possible combination of the above-described embodiments.

The invention claimed is:

1. A fluid spraying facility comprising:
   a fluid circulation conduit;
   a scraper flowing in said conduit, comprising a first magnet; and
   an envelope defining a storage volume receiving said scraper in a storage position of said scraper, said scraper pushing fluid present in said conduit ahead of said scraper, as said scraper flows through said conduit, the storage volume being in fluid communication with said conduit and allowing said scraper to flow between the storage volume and said conduit, the envelope comprising a second magnet exerting a first force on said first magnet to displace said scraper from the storage volume to said conduit.

2. The facility according to claim 1, wherein said first magnet comprises a permanent magnet.

3. The facility according to claim 1, wherein said second magnet comprises a permanent magnet.

4. The facility according to claim 1, wherein said second magnet comprises an electromagnet.

5. The facility according to claim 4, wherein said second magnet exerts the first force when said second magnet is supplied with an electric current having a first direction, and exerts a second force keeping said scraper in the storage volume, when said second magnet is supplied with an electric current having a second direction opposite the first direction.

6. The facility according to claim 5, wherein the second force brings said scraper closer to said second magnet.

7. The facility according to claim 1, wherein said envelope delimits an opening traversed by said scraper when said scraper is circulating from the storage volume to said conduit, said scraper being interposed between said second magnet and the opening when said scraper is received in the storage volume.

8. The facility according to claim 7, wherein the first force moves said first magnet away from said second magnet.

9. The facility according to claim 1, wherein said second magnet bears against an outer surface of said envelope.

10. The facility according to claim 1, wherein said envelope delimits a first opening connecting the storage volume to said conduit and a second opening leading into the storage volume, the storage volume being interposed between the two openings, the facility further comprising means for injecting fluid into said envelope through the second opening, said second magnet being accommodated in an internal volume of said envelope and being interposed between the second opening and the storage volume, said envelope further delimiting at least one passage that conducts the injected fluid from the second opening to the first opening when said scraper is in the storage position.

11. The facility according to claim 1, wherein said second magnet exerts on said first magnet a force of between 1.5 newtons and 5 newtons when said scraper is in the storage position.

12. The facility according to claim 1, further comprising an actuator configured to move a pin between a first position in which the pin obstructs movement of said scraper from its storage position to said conduit, and a second position in which the pin allows said scraper to pass from the storage position to said conduit.

13. The facility according to claim 1, further comprising a sensor measuring values of a magnetic field and detecting presence of said scraper in the storage volume based on the measured magnetic field values.

14. The facility according to claim 13, wherein said sensor compares a measured magnetic field value to a threshold, and detects presence of said scraper when the measured value is greater than or equal to the threshold.

15. The facility according to claim 14, wherein the first force moves said scraper in a direction parallel to an axis of the storage volume, said first magnet and said second magnet being offset from each other along the axis, said sensor being measuring magnetic field values at a point in a plane perpendicular to the axis, the plane being interposed along the axis between said first magnet and said second magnet.

* * * * *